United States Patent
Kim et al.

(10) Patent No.: US 11,382,072 B2
(45) Date of Patent: Jul. 5, 2022

(54) METHOD FOR TRANSMITTING/RECEIVING SIGNAL ON BASIS OF LTE AND NR IN WIRELESS COMMUNICATION SYSTEM, AND DEVICE THEREFOR

(71) Applicant: LG Electronics Inc., Seoul (KR)

(72) Inventors: Youngtae Kim, Seoul (KR); Yunjung Yi, Seoul (KR); Inkwon Seo, Seoul (KR); Jaehyung Kim, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 16/638,364

(22) PCT Filed: Aug. 13, 2018

(86) PCT No.: PCT/KR2018/009272
§ 371 (c)(1),
(2) Date: Feb. 11, 2020

(87) PCT Pub. No.: WO2019/031946
PCT Pub. Date: Feb. 14, 2019

(65) Prior Publication Data
US 2020/0169998 A1 May 28, 2020

Related U.S. Application Data

(60) Provisional application No. 62/566,564, filed on Oct. 2, 2017, provisional application No. 62/558,921, filed
(Continued)

(51) Int. Cl.
*H04W 72/04* (2009.01)
*H04W 4/06* (2009.01)
*H04L 12/18* (2006.01)

(52) U.S. Cl.
CPC ......... *H04W 72/0406* (2013.01); *H04W 4/06* (2013.01); *H04W 72/0446* (2013.01); *H04L 12/189* (2013.01)

(58) Field of Classification Search
CPC ....... H04L 1/00; H04L 5/0007; H04L 5/0053; H04L 5/0091; H04L 12/189; H04W 4/06; H04W 72/0406; H04W 72/0446
See application file for complete search history.

(56) References Cited

U.S. PATENT DOCUMENTS

2014/0313945 A1* 10/2014 Beale ................. H04L 5/0053
370/277
2016/0014740 A1* 1/2016 Papasakellariou .... H04L 1/0026
370/329
(Continued)

OTHER PUBLICATIONS

AT&T, "On forward compatible resources in NR," R1-1707731, 3GPP TSG RAN WG1 Meeting #89, Hangzhou, P.R. China, dated May 15-19, 2017, 3 pages.
(Continued)

*Primary Examiner* — Khaled M Kassim
*Assistant Examiner* — Kai Chang
(74) *Attorney, Agent, or Firm* — Fish & Richardson P.C.

(57) ABSTRACT

The present invention relates to a method and a device for a New Radio (NR) access technology base station transmitting a signal in a wireless communication system. Specifically, the method comprises the steps of: checking a configuration associated with a subframe assigned to a Long Term Evolution (LTE) band; according to the checked configuration, determining a resource region in which a NR downlink signal may be assigned in the LTE band in a specific subframe shared for NR communication; and transmitting a control resource set (CORSET) via the resource region. The NR UE is capable of communicating with at
(Continued)

least one of another UE, a UE related to an autonomous driving vehicle, a base station or a network.

8 Claims, 15 Drawing Sheets

Related U.S. Application Data on Sep. 15, 2017, provisional application No. 62/543,978, filed on Aug. 11, 2017.

(56) References Cited

U.S. PATENT DOCUMENTS

| | | | |
|---|---|---|---|
| 2018/0183551 A1* | 6/2018 | Chou | H04L 5/0098 |
| 2018/0192404 A1* | 7/2018 | Maaref | H04L 5/0048 |
| 2018/0242283 A1* | 8/2018 | Feng | H04L 27/0006 |
| 2018/0270713 A1* | 9/2018 | Park | H04W 74/0833 |
| 2018/0279210 A1* | 9/2018 | Sun | H04L 25/0238 |
| 2018/0279327 A1* | 9/2018 | Ying | H04W 72/0446 |
| 2018/0302926 A1* | 10/2018 | Bhorkar | H04W 16/14 |
| 2018/0367985 A1* | 12/2018 | Novlan | H04W 8/22 |
| 2019/0174440 A1* | 6/2019 | Kwak | H04W 56/001 |
| 2019/0223156 A1* | 7/2019 | Fujishiro | H04L 65/4076 |
| 2019/0261189 A1* | 8/2019 | Huang | H04W 72/1242 |
| 2019/0357208 A1* | 11/2019 | Liu | H04L 5/0094 |
| 2019/0357264 A1* | 11/2019 | Yi | H04L 5/001 |
| 2019/0393992 A1* | 12/2019 | Xiong | H04L 5/0055 |
| 2020/0067676 A1* | 2/2020 | Yi | H04W 72/042 |
| 2020/0178099 A1* | 6/2020 | Miao | H04W 24/08 |
| 2020/0214015 A1* | 7/2020 | Zhou | H04W 72/0493 |

OTHER PUBLICATIONS

Ericsson, "PDSCH rate matching," R1-1708694, 3GPP TSG-RAN WG1 #89, Hangzhou, China, dated May 15-19, 2017, 2 pages.

LG Electronics, "Remaining details on DL sharing between LTE and NR," R1-1710353, 3GPP TSG RAN WG1 Meeting Ad-Hoc, Qingdao, P.R. China, dated Jun. 27-30, 2017, 3 pages.

PCT International Search Report and Written Opinion in International Application No. PCT/KR2018/009272, dated Nov. 23, 2018, 23 pages (with English translation).

Qualcomm Incorporated, "NR-LTE Co-channel Coexistence Considerations," R1-1708655, 3GPP TSG-RAN WG1 #89, Hangzhou, P.R. China, dated May 15-19, 2017, 6 pages.

Samsung, "LTE-NR coexistence for DL," R1-1708061, 3GPP TSG RAN WG1 #89, Hangzhou, China, dated May 15-19, 2017, 3 pages.

* cited by examiner (a) Control-plane protocol stack (b) User-plane protocol stack

METHOD FOR TRANSMITTING/RECEIVING SIGNAL ON BASIS OF LTE AND NR IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2018/009272, filed on Aug. 13, 2018, which claims the benefit of U.S. Provisional Application No. 62/566,564, filed on Oct. 2, 2017, U.S. Provisional Application No. 62/558,921, filed on Sep. 15, 2017, and U.S. Provisional Application No. 62/543,978, filed on Aug. 11, 2017. The disclosures of the prior applications are incorporated by reference in their entirety.

TECHNICAL FIELD

The present disclosure relates to a wireless communication system and, more particularly, to a method of transmitting and receiving signals based on long-term evolution (LTE) and new radio access technology (NR) in a wireless communication system and an apparatus therefor.

BACKGROUND ART

Wireless access systems have been widely deployed to provide various types of communication services such as voice or data. In general, a wireless access system is a multiple access system that supports communication of multiple users by sharing available system resources (bandwidth, transmission power, etc.) thereamong. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As more communication devices have demanded higher communication capacity, there has been necessity of enhanced mobile broadband communication relative to legacy radio access technology (RAT). In addition, massive machine type communication (MTC) for providing various services at anytime and anywhere by connecting a plurality of devices and things to each other becomes one issue to be considered in next-generation communication. Moreover, design of a communication system considering services/UEs sensitive to reliability and latency has been discussed.

As new RAT considering such enhanced mobile broadband communication, massive MTC, ultra-reliable and low latency communication (URLLC), and the like, a new RAT system has been proposed. In the present disclosure, the corresponding technology is referred to as new RAT or new radio (NR) for convenience of description.

DETAILED DESCRIPTION OF THE DISCLOSURE

Technical Problems

Hereinafter, a method of transmitting and receiving signals based on LTE and NR in a wireless communication system and an apparatus therefor will be proposed based on the above-described discussion.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

According to an aspect of the present disclosure, provided herein is a method a method of transmitting a signal by a new radio access technology (NR) base station (BS) in a wireless communication system, including confirming a configuration associated with a subframe allocated to a long-term evolution (LTE) band; determining a resource region to which an NR downlink signal is allocable in a specific subframe shared for NR communication in the LTE band according to the confirmed configuration; and transmitting a control resource set (CORESET) through the resource region.

The specific subframe may be a multicast-broadcast single-frequency network (MBSFN) subframe.

The CORESET may be allocated by being rate-matched in a resource region except for a control information region for LTE communication in the specific subframe.

The method may further include transmitting information about the resource region to an NR user equipment (UE) through higher layer signaling or transmitting a configuration regarding the CORESET to an NR user equipment (UE).

The CORESET may be allocated after a control information region for LTE communication.

The specific subframe may be obtained by shifting a subframe boundary by up to a maximum value of a control information region for LTE communication.

In another aspect of the present disclosure, provided herein is a new radio access technology (NR) base station (BS), including a radio frequency unit; and a processor coupled to the radio frequency unit, wherein the processor is configured to confirm a configuration associated with a subframe allocated to a long-term evolution (LTE) band, determine a resource region to which an NR downlink signal is allocable in a specific subframe shared for NR communication in the LTE band according to the confirmed configuration, and transmit a control resource set (CORESET) through the resource region.

In another aspect of the present disclosure, provided herein is a method of receiving a signal by a new radio access technology (NR) user equipment (UE) in a wireless communication system, including confirming a configuration associated with a subframe allocated to a long-term evolution (LTE) band; and receiving a control resource set (CORESET) through a resource region to which an NR downlink signal is allocated in a specific subframe shared for NR communication in the LTE band.

In another aspect of the present disclosure, provided herein is a new radio access technology (NR) user equipment (UE) for receiving a signal in a wireless communication system, including a radio frequency unit; and a processor coupled to the radio frequency unit, wherein the processor is configured to confirm a configuration associated with a subframe allocated to a long-term evolution (LTE) band, and receive a control resource set (CORESET) through a resource region to which an NR downlink signal is allocated in a specific subframe shared for NR communication in the LTE band.

Advantageous Effects

According to embodiments of the present disclosure, LTE and NR based signals may be efficiently transmitted and received in a wireless communication system.

Effects obtainable from the present disclosure are non-limited by the above mentioned effect. And, other unmentioned effects can be clearly understood from the following description by those having ordinary skill in the technical field to which the present disclosure pertains

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

BEST MODE FOR CARRYING OUT THE DISCLOSURE

A 3rd generation partnership project long term evolution (3GPP LTE) (hereinafter, referred to as 'LTE') communication system which is an example of a wireless communication system to which the present disclosure can be applied will be described in brief.

Figure 1:
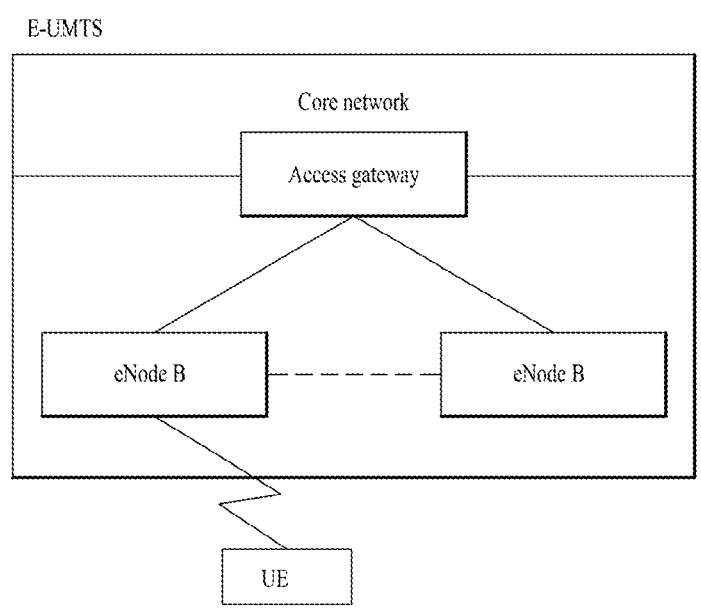
FIG. 1 schematically illustrates an E-UMTS network structure as an example of a wireless communication system.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (BSs) (or eNode B or eNB), and an Access Gateway (AG) which is located at an end of a network (E-UTRAN) and connected to an external network. The BSs may simultaneously transmit multiple data streams for a broadcast service, a multicast service and/or a unicast service.

One or more cells exist for one BS. One cell is set to one of bandwidths of 1.44, 3, 5, 10, 15 and 20 MHz to provide a downlink or uplink transport service to several UEs. Different cells may be set to provide different bandwidths. Also, one BS controls data transmission and reception for a plurality of UEs. The BS transmits downlink (DL) scheduling information of downlink data to the corresponding UE to notify the corresponding UE of time and frequency domains to which data will be transmitted and information related to encoding, data size, and hybrid automatic repeat and request (HARQ). Also, the BS transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the BSs. A Core Network (CN) may include the AG and a network node or the like for user registration of the UE. The AG manages mobility of the UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the UE, etc. are required.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present disclosure are not limited to the 3GPP LTE/LTE-A. Also, specific terminologies hereinafter used in the embodiments of the present disclosure are provided to assist understanding of the present disclosure, and various modifications may be made in the specific terminologies within the range that they do not depart from technical spirits of the present disclosure.

Figure 2:
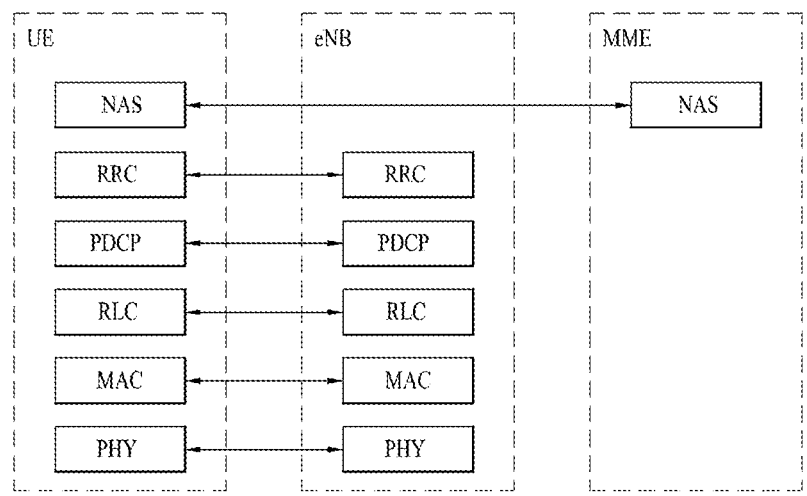
FIG. 2 illustrates control plane and user plane structures of a radio interface protocol between a UE and an E-UTRAN on the basis of the 3GPP wireless access network standard.
Figure 2:
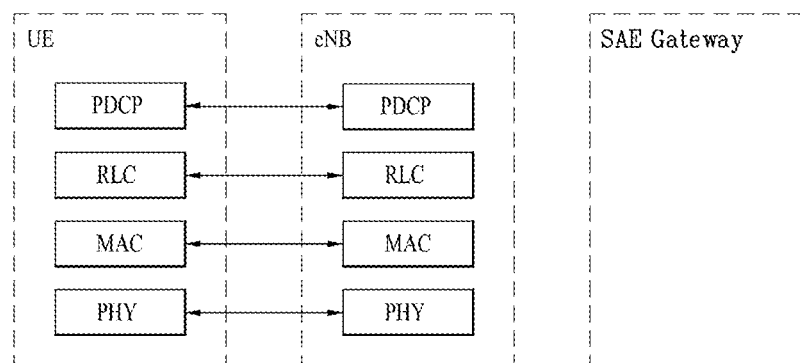

FIG. 2 is a diagram illustrating structures of a control plane and a user plane of a radio interface protocol between a UE and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the UE and the network. To this end, the RRC layers of the UE and the network exchange RRC message with each other. If the RRC layer of the UE is RRC connected with the RRC layer of the network, the UE is in an RRC connected mode. If not so, the UE is in an RRC idle mode. A non-access stratum (NAS) layer located above the RRC layer performs functions such as session management and mobility management.

One cell constituting a BS (or eNB) is set to one of bandwidths of 1.4, 3.5, 5, 10, 15, and 20 MHz and provides a downlink or uplink transmission service to several UEs. At this time, different cells may be set to provide different bandwidths.

As downlink transport channels carrying data from the network to the UE, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the UE to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
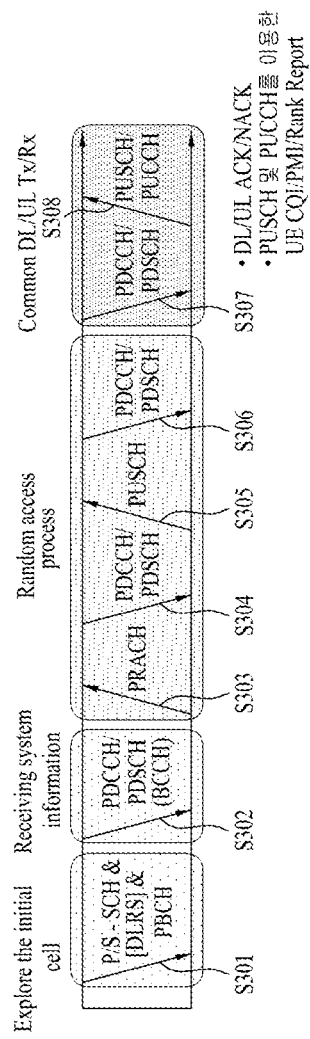
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The UE performs initial cell search such as synchronizing with the BS when it newly enters a cell or the power is turned on at step S301. To this end, the UE synchronizes with the BS by receiving a primary synchronization channel (P-SCH) and a secondary synchronization channel (S-SCH) from the BS, and acquires information such as cell ID, etc. Afterwards, the UE may acquire broadcast information within the cell by receiving a physical broadcast channel (PBCH) from the BS. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH at step S302.

Afterwards, the UE may perform a random access procedure (RACH) such as steps S303 to S306 to complete access to the BS. To this end, the UE may transmit a preamble through a physical random access channel (PRACH) (S303), and may receive a response message to the preamble through the PDCCH and the PDSCH corresponding to the PDCCH (S304). In case of a contention based RACH, the UE may perform a contention resolution procedure such as transmission (S305) of additional physical random access channel and reception (S306) of the physical downlink control channel and the physical downlink shared channel corresponding to the physical downlink control channel.

The UE which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the UE to the BS will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the UE may non-periodically transmit the UCI through the PUSCH in accordance with request/command of the network.

Figure 4:
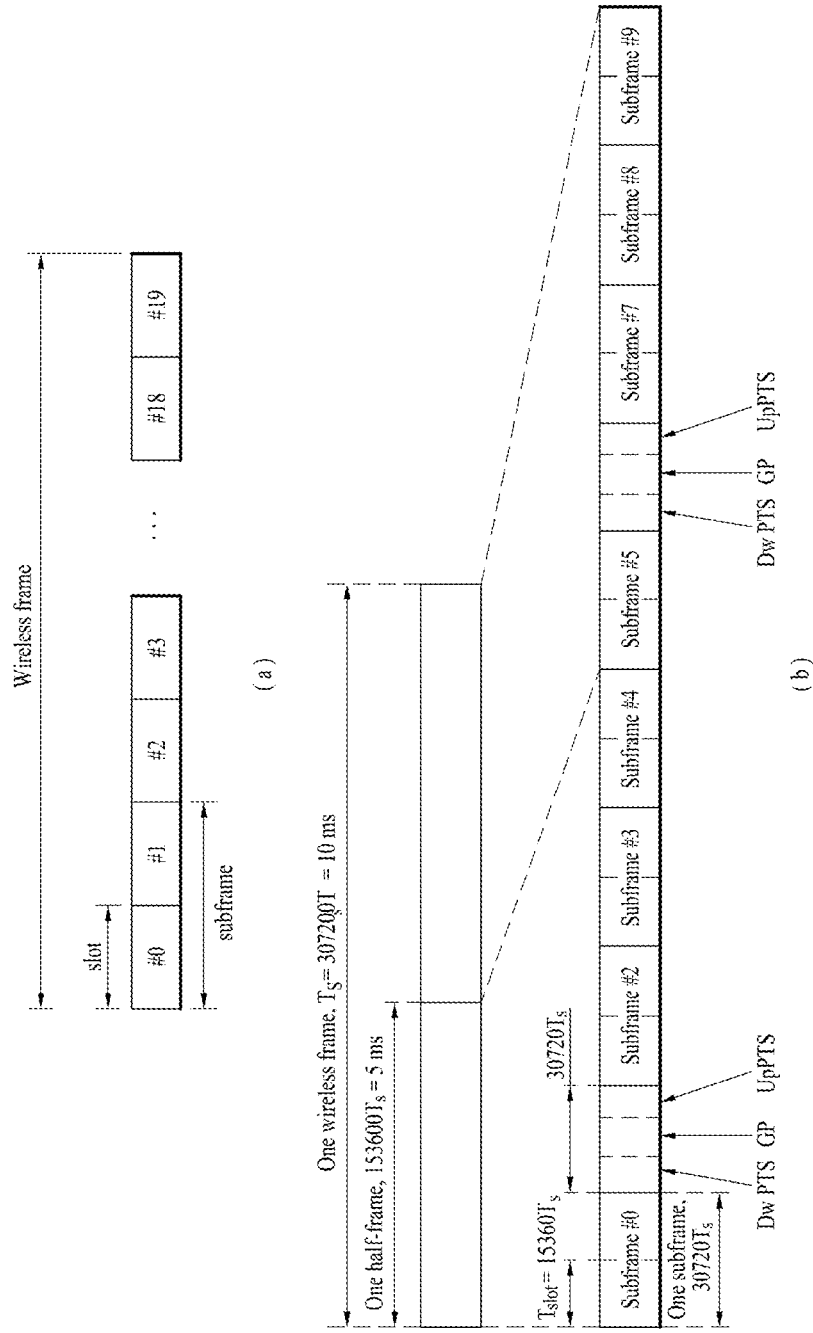
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the UE. The UpPTS is used for channel estimation at the BS and uplink transmission synchronization of the UE. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
| | | UpPTS | | | UpPTS | |
| | DwPTS | Normal cyclic prefix in uplink | Extended cyclic prefix uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink Configuration | Downlink-to-Uplink Switch-point periodicity | Subframe number | | | | | | | | | |
| | | 0 | 1 | 2 | 3 | 4 | 5 | 6 | 7 | 8 | 9 |
| --- | --- | --- | --- | --- | --- | --- | --- | --- | --- | --- | --- |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
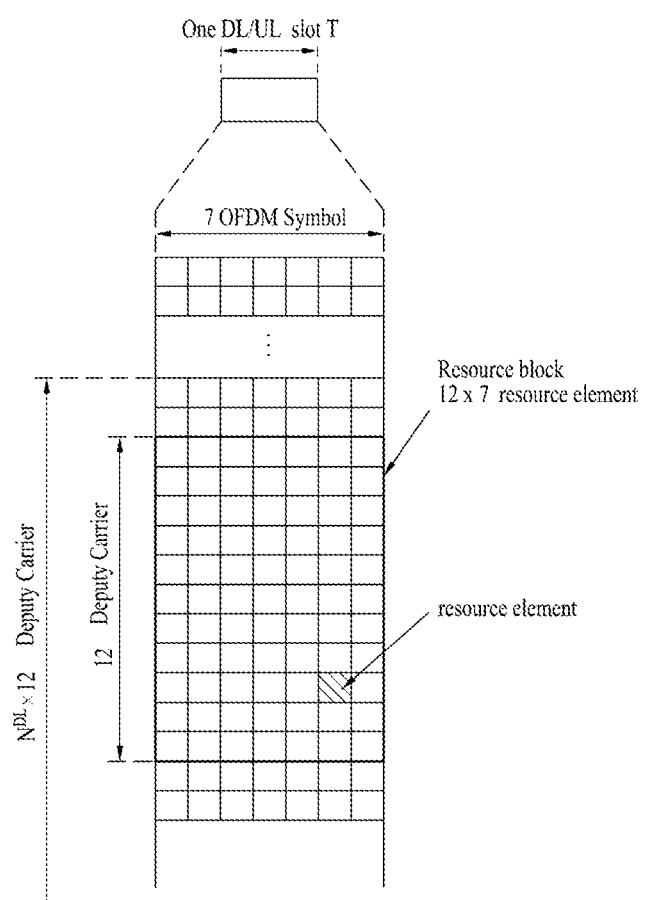
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{sc}^{RB}$ subcarriers, the DL slot includes $N_{RB}^{DL} \times N_{sc}^{RB}$ subcarriers in the frequency domain. Although FIG. 5 shows an example in which the DL slot includes 7 OFDM symbols and the resource block includes 12 subcarriers, the present disclosure is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{sc}^{RB}$ resource elements. The number ($N_{RB}^{DL}$) of resource blocks included in the DL slot depends on a DL transmission bandwidth configured in a cell.

Figure 6:
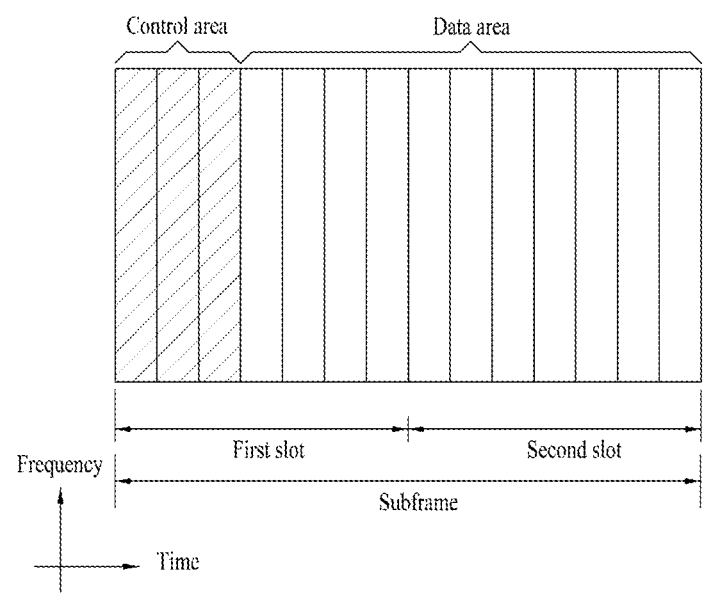
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a UE or a UE group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual UEs in a UE group, a Tx power control command, activation indication information of a VoIP (voice over IP) and the like. A plurality of PDCCHs may be transmitted in a control region. A UE can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A BS determines the PDCCH format in accordance with DCI to be transmitted to a UE and attaches CRC (cyclic redundancy check) to control information. The CRC is masked with an identifier (e.g., RNTI (radio network temporary identifier)) in accordance with an owner or a purpose of use. For instance, if a PDCCH is provided for a specific UE, CRC may be masked with an identifier (e.g., C-RNTI (cell-RNTI)) of the corresponding UE. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
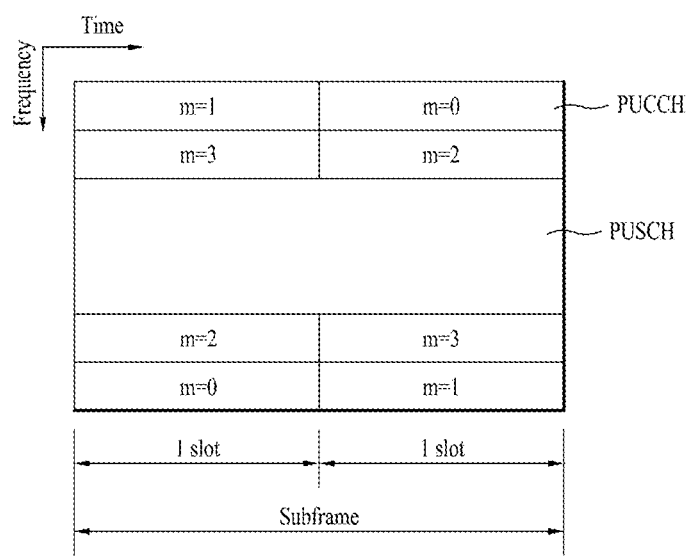
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a UE can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinbelow, a new radio access technology system will be described. As more communication devices have demanded higher communication capacity, there has been necessity of enhanced mobile broadband communication relative to legacy radio access technology (RAT). In addition, massive machine type communication (MTC) for providing various services at anytime and anywhere by connecting a plurality of devices and things to each other has also been required. Moreover, design of a communication system considering services/UEs sensitive to reliability and latency has been proposed.

As new RAT considering such enhanced mobile broadband communication, massive MTC, ultra-reliable and low latency communication (URLLC), and the like, a new RAT system has been proposed. In the present disclosure, the corresponding technology is referred to as new RAT or new radio (NR) for convenience of description.

The NR system to which the present disclosure is applicable supports various OFDM numerologies shown in the following table. In this case, the value of μ and cyclic prefix information per carrier bandwidth part may be signaled for each of DL and UL. For example, the value of μ and cyclic prefix information per DL carrier bandwidth part may be signaled though DL-BWP-mu and DL-MWP-cp corresponding to higher layer signaling. As another example, the value of μ and cyclic prefix information per UL carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A frame structure in NR will now be described. For DL and UL transmission, a frame having a length of 10 ms is configured. The frame may include 10 subframes, each having a length of 1 ms. In this case, the number of consecutive OFDM symbols in each subframe is $N_{symb}^{subframe, \mu} = N_{symb}^{slot} N_{slot}^{subframe, \mu}$.

Each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu = \in \{0, \ldots, N_{slot}^{subframe, \mu} - 1\}$ and may also be numbered within one frame in ascending order like $n_{s,f}^\mu = \in \{0, \ldots, N_{slot}^{frame, \mu} - 1\}$. In this case, the number of consecutive OFDM symbols ($N_{symb}^{slot}$) in one slot may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 below shows the number of OFDM symbols in each slot/frame/subframe in the case of a normal cyclic prefix, and Table 5 below shows the number of OFDM symbols in each slot/frame/subframe in the case of an extended cyclic prefix.

TABLE 4

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the NR system to which the present disclosure is applicable, a self-contained slot structure may be applied based on the above-described slot structure.

Figure 8:
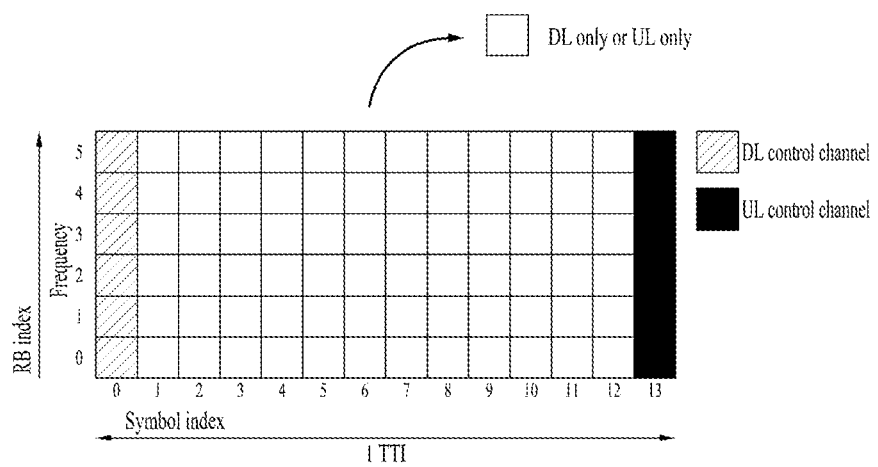
FIG. 8 is a reference diagram for explaining a self-contained slot structure in an NR system.

FIG. 8 is a reference diagram for explaining a self-contained slot structure applicable to the present disclosure.

In FIG. 8, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, the eNB and UE may sequentially perform DL transmission and UL transmission in one slot. That is, the eNB and UE may transmit and receive DL data and UL ACK/NACK in response to the DL data in one slot. Consequently, due to such a structure, it is possible to reduce a time required until data retransmission in the case in which a data transmission error occurs, thereby minimizing the latency of final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although the case in which the self-contained slot structure includes both the DL and UL control regions has been described above, these control regions may be selectively included in the self-contained slot structure. In other words, the self-contained slot structure according to the present disclosure may include either the DL control region or the UL control region as well as both the DL and UL control regions as illustrated in FIG. 8.

For example, the slot may have various slot formats. In this case, OFDM symbols in each slot may be divided into DL symbols (denoted by 'D'), flexible symbols (denoted by 'X'), and UL symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

Hereinafter, analog beamforming will be described.

In a millimeter wave (mmW) system, since a wavelength is short, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is difficult because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 9:
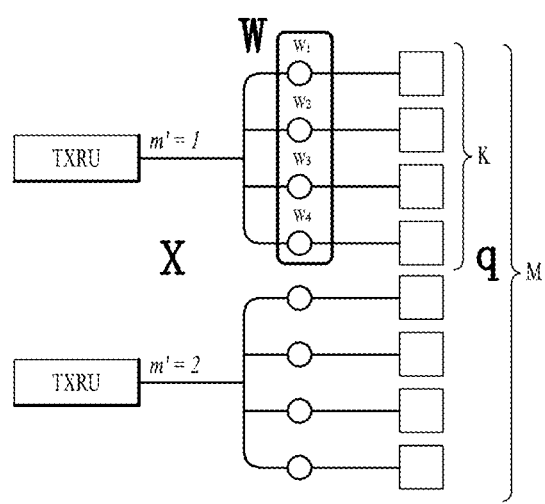
FIGS. 9 and 10 are reference diagrams for explaining methods for connecting TXRUs to antenna elements.
Figure 10:
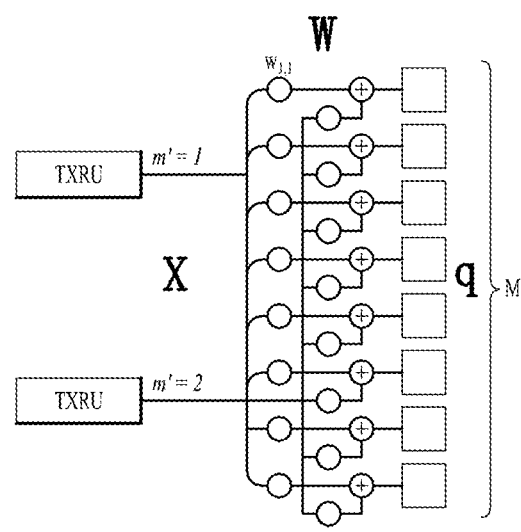

FIGS. 9 and 10 are diagrams illustrating representative methods for connecting TXRUs to antenna elements. Here, the TXRU virtualization model represents the relationship between TXRU output signals and antenna element output signals.

FIG. 9 illustrates a method for connecting TXRUs to sub-arrays. In FIG. 9, an antenna element is connected to only one TXRU.

Meanwhile, FIG. 10 illustrates a method for connecting all TXRUs to all antenna elements. In FIG. 10, an antenna element is connected to all TXRUs. In this case, separate addition units are required to connect an antenna element to all TXRUs as illustrated in FIG. 8.

In FIGS. 9 and 10, W indicates a phase vector weighted by an analog phase shifter. That is, W is a main parameter determining the direction of analog beamforming. In this case, the mapping relationship between CSI-RS antenna ports and TXRUs may be 1:1 or 1-to-many.

The configuration illustrated in FIG. 9 has a disadvantage in that it is difficult to achieve BF focusing but has an advantage in that all antennas may be configured at low cost.

The configuration illustrated in FIG. 10 is advantageous in that beamforming focusing may be easily achieved. However, since all antenna elements are connected to the TXRU, the configuration has a disadvantage of increase in cost.

When a plurality of antennas is used in the NR system to which the present disclosure is applicable, the hybrid BF method obtained by combining digital BF and analog BF may be applied. In this case, analog (or radio frequency (RF)) BF means an operation in which precoding (or combining) is performed at an RF end. In the case of hybrid BF, precoding (or combining) is performed at each of a baseband end and the RF end. Thus, hybrid BF is advantageous in that it guarantees performance similar to digital BF while reducing the number of RF chains and digital-to-analog (D/A) (or analog-to-digital (A/D)) converters.

For convenience of description, the hybrid BF structure may be represented by N TXRUs and M physical antennas. In this case, digital BF for L data layers to be transmitted by a transmitting end may be represented by an N*L (N by L) matrix. Thereafter, N converted digital signals are converted into analog signals by the TXRUs, and then analog BF, which may be represented by an M*N (M by N) matrix, is applied to the converted signals.

Figure 11:
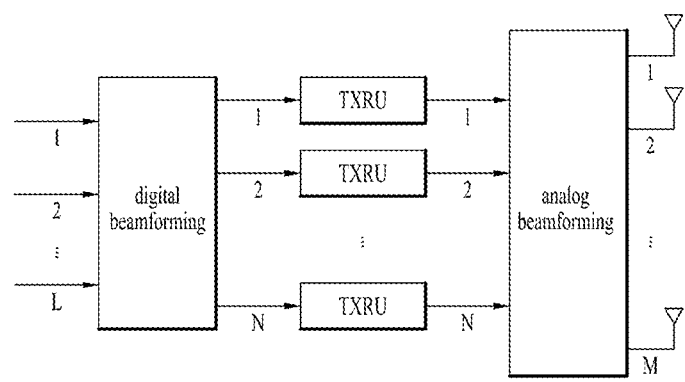
FIG. 11 is a reference diagram for explaining hybrid beamforming.

FIG. 11 is a schematic diagram illustrating a hybrid BF structure from the perspective of TXRUs and physical antennas. In FIG. 11, the number of digital beams is L and the number of analog beams is N.

Additionally, a method for providing efficient BF to UEs located in a specific area by designing an eNB capable of changing analog BF on a symbol basis has been considered in the NR system. Further, when N TXRUs and M RF antennas are defined as one antenna panel, a method of introducing a plurality of antenna panels in which independent hybrid BF may be applied has also been considered in the NR system according to the present disclosure.

When the eNB uses a plurality of analog beams as described above, each UE has a different analog beam suitable for signal reception. Thus, a beam sweeping operation in which the eNB transmits signals (at least synchronization signals, system information, paging, etc.) by applying a different analog beam to each symbol in a specific subframe in order to allow all UEs to have reception opportunities has been considered in the NR system to which the present disclosure is applicable.

Hereinafter, in the present disclosure, when an NR BS shares DL with LTE in a band/spectrum/carrier used in LTE, NR DL transmission in an LTE DL subframe will be described.

Currently, in 3GPP Rel. 15, a method in which the NR BS shares DL with LTE in the LTE band is under discussion. With regard to this method, the present disclosure proposes a method in which a multicast-broadcast single-frequency network (MBSFN) subframe is configured in the LTE band, and the configuration is transmitted through multimedia broadcast multicast services (MBMS) or resources not used for other purposes are indicated to the NR BS, so that the NR BS may transmit a DL signal in the LTE MBSFN subframe.

However, basically, in an NR-LTE coexistence scenario, even though the MBSFN subframe is allocated for NR transmission, a trend for use of a PDCCH region in the MBSFN subframe by LTE is under discussion. Basically, this has a purpose of not reducing an LTE control channel region even if NR transmission is shared in the LTE band and also has a purpose of preventing collision caused by performing NR transmission in the PDCCH region because many cell-specific reference signals (CRSs) are arranged in the PDCCH region. Therefore, while the present disclosure mainly describes NR DL transmission in the LTE MBSFN subframe for convenience of description, NR DL transmission may also be applied in the same manner to an LTE non-MBSFN subframe.

First Embodiment

According to the first embodiment, when performing NR DL transmission in the LTE MBSFN subframe, the NR BS transmits a DL signal by rate-matching a resource region except for a maximum PDCCH region in the LTE MBSFN subframe. Here, although the maximum PDCCH region may be operated with the same value in consideration of both the MBSFN subframe and a non-MBSFN subframe, the maximum PDCCH region may be operated with different values.

In the LTE MBSFN subframe, the PDCCH region may be 1 or 2 OFDM symbols. However, this value is indicated in every subframe and it is very difficult for the NR BS to receive the value from LTE through an X2 interface prior to performing transmission in every subframe. Accordingly, it may be appreciated that NR transmission is performed by rate-matching two symbols corresponding to the maximum PDCCH region.

However, in the case of ideal backhaul, it may be regulated that the NR BS performs transmission by dynamically rate-matching the PDCCH region rather than by rate-matching the maximum PDCCH region. In this case, the NR BS may inform the UE of how many degrees the PDCCH region occupies through a control channel. For example, the NR BS may inform the UE of the PDCCH region through the control channel in a previous subframe. After how many subframes or how many slots the LTE PDCCH region indicated by the NR BS through the control channel is located based on LTE may be predefined or may be indicated by higher layer signaling (e.g., RRC signaling).

Alternatively, when transmitting an NR DL signal through rate matching, a control resource set (CORESET) of the NR DL signal will basically be located after the LTE PDCCH region (rate-matched region) in the LTE MBSFN subframe is ended. Accordingly, the resource position of the CORESET in a CORESET configuration may be recognized as the first symbol after the LTE PDCCH region is ended.

For example, assuming that the CORESET is configured to be located from the first OFDM symbol up to the second OFDM symbol and the PDCCH region to be rate-matched in the LTE MBSFN subframe is 2 OFDM symbols, the UE may reinterpret the CORESET as being located from the third OFDM symbol up to the fourth OFDM symbol. This serves to prevent the position of the CORESET from being reconfigured every time the MBSFN subframe appears. Further, whether to use this reinterpretation may be indicated to the UE through the control channel or higher layer signaling (e.g., RRC signaling). If whether to use this reinterpretation is indicated through the control channel, after how many slots or symbols from the indicated control channel the reinterpretation is applied or after how many slots or symbols the reinterpretation is continuously applied may be predefined or may be indicated through higher layer signaling (e.g., RRC signaling). Alternatively, it may be regulated that the BS directly configures the position of the CORESET suitable for the MBSFN subframe without the reinterpretation.

Alternatively, when the NR BS transmits the NR DL signal through rate matching, it may be regulated that transmission of a PDCCH in the CORESET is performed by rate-matching the position of an NR demodulation reference signal (DMRS). Currently, the NR DL DMRS is supposed to be located in the third or fourth OFDM symbol according to bandwidth. However, if the LTE PDCCH region is rate-matched when NR DL transmission is performed in the LTE MBSFN subframe, the region of the CORESET may be located up to later than the OFDM symbol in which the NR DMRS is located. Therefore, during transmission of the PDCCH in the CORESET, it may be regulated that the position of the NR DMRS is rate-matched. Whether to use rate matching for the DMRS position may be indicated to the UE through the control channel or higher layer signaling (e.g., RRC signaling). If whether to use rate matching for the DMRS position is indicated through the control channel, after how many slots or symbols from the indicated control channel rate matching for the DMRS position is applied or after how many slots or symbols rate matching for the DMRS position is continuously applied may be predefined or may be indicated through higher layer signaling (e.g., RRC signaling). Alternatively, it may be regulated that the DMRS is located by being shifted by the number of rate-matched symbols for the PDCCH in the LTE MB SFN subframe, without rate-matching the DMRS position in the CORESET. Whether to shift the DMRS position may be indicated to the UE through the control channel or higher layer signaling (e.g., RRC signaling). If whether to shift the DMRS position is indicated through the control channel, after how many slots or symbols from the indicated control channel the shift is applied or after how many slots or symbols the shift is continuously applied may be predefined or may be indicated through higher layer signaling (e.g., RRC signaling).

Second Embodiment

According to the second embodiment, when transmitting the NR DL signal in the LTE MBSFN subframe, a frame boundary may be shifted by the maximum PDCCH region so that a control channel region of the LTE MBSFN may not collide with DL transmission of NR.

In this case, only an NR DL subframe or an NR DL region may be shifted. This means that it is assumed that a starting point of the NR DL subframe is recognized as a point immediately after an LTE PDCCH region. An end point of the NR DL subframe may be ended with an end point of the LTE subframe.

Alternatively, the frame boundary may not be shifted and only the DMRS position may be shifted by the (maximum) LTE PDCCH region. Then, mapping of the CORESET may be secured before the DMRS.

Third Embodiment

In the third embodiment, in the case of numerology transmission of a 15 kHz subcarrier spacing in current NR, a synchronization signal (SS) block of 15 kHz and 30 kHz subcarrier spacings may be transmitted. However, a problem arises when the SS block of the 30 kHz subcarrier spacing is transmitted in a non-MBSFN subframe of the LTE DL band. In order to protect the LTE PDCCH region, and symbols to which the CRS is mapped, the following agreement is in progress to transmit the SS block of the 30 kHz subcarrier spacing.

For 30 kHz subcarrier spacing case, the second SS block mapping pattern is
  Map two SS blocks candidate locations to the slot of 14 symbols as follows
    First candidate location is at symbols 2-5
    Second candidate location is at symbols 8-11
  Note: In the case of NR-LTE coexistence, the first SS block mapping pattern (i.e., page 7 in R1-1711899) can be used
  Note: It is up to RAN4 to decide the SS block mapping pattern for each frequency band When the SS block is transmitted in symbols 2, 3, 4, 5, 8, 9, 10, and 11 based on the 15 kHz subcarrier spacing, collision occurs in symbols 0, 1, 4, 7, 8, and 11 in which the LTE CRS is transmitted. Accordingly, in order to protect the LTE PDCCH and the CRS, the SS block may be transmitted in symbols 2, 3, 9, and 10 as illustrated in FIG. 12.

Figure 12:
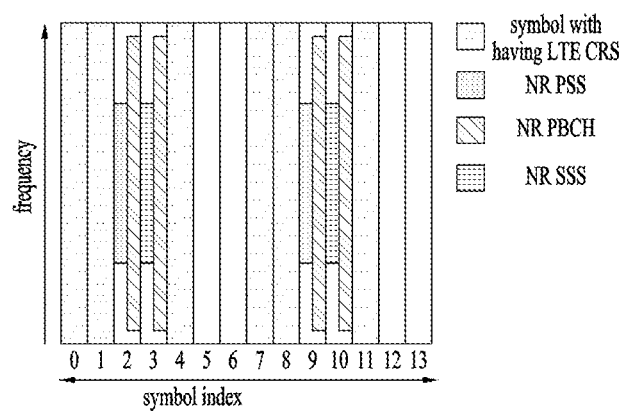
FIGS. 12 to 16 are reference diagrams for explaining resource allocation scenarios according to an embodiment of the present disclosure.

However, when transmitting the SS block as illustrated in FIG. 12, it is difficult to search for a position at which an (RMSI) CORESET or an NR (RMSI) PDCCH is to be transmitted. In this case, the (RMSI) CORESET and the NR (RMSI) PDCCH may be transmitted in symbols 5, 6, 12, and 13. Alternatively, the (RMSI) CORESET may be mapped to a frequency region in which the SS block is not transmitted in symbol 2 or 3 (or including a symbol 9 or 10) and the NR (RMSI) PDCCH may be transmitted in symbols 5, 6, 12, and 13 (or including a symbol 9 or 10). When transmitting the (RMSI) CORESET or the NR (RMSI) PDCCH together in symbols in which the SS block is transmitted, such as symbols 5, 6, 12, and 13, transmission may be performed with the 30 kHz subcarrier spacing to adjust subcarrier spacings. Alternatively, transmission may be performed with the 15 kHz subcarrier spacing, wherein the SS block and a few frequency tones may be dropped so as to reduce intercell interference (ICI) interference.

Here, essential system information which is absolutely necessary for the UE to access a network in NR is referred to as minimum system information (Min. SI). The most essential information out of the Min. SI is transmitted on a PBCH and the other Min. SI which is not transmitted on the PBCH is referred to as the remaining Min. SI (RMSI).

Figure 13:
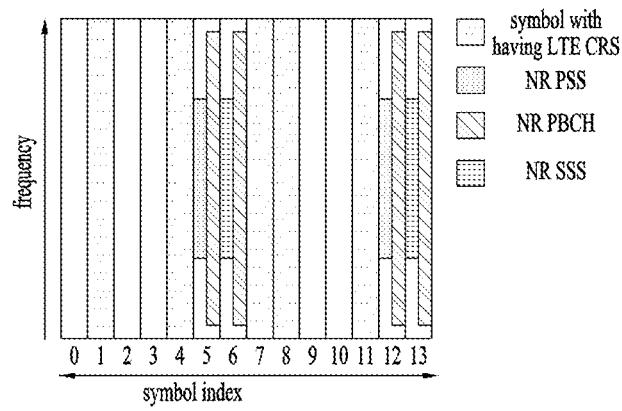

Alternatively, as illustrated in FIG. 13, the SS block may be transmitted in symbols 5, 6, 12, and 13 so that the (RMSI) CORESET may not be frequency-division-multiplexed (FDMed) with the SS block in symbol 2 or 3. Such transmission may secure the (RMSI) CORESET in symbol 2 or 3 and protect the LTE PDCCH and the CRS.

In the case of transmission as illustrated in FIG. 13, the (RMSI) CORESET may be mapped to the SS block without frequency division multiplexing (FDM) in symbol 2 or 3 (or including a symbol 9 or 10) and the NR (RMSI) PDCCH may be transmitted in the remaining regions. When the NR (RMSI) PDCCH is transmitted together in symbols in which the SS block is transmitted, such as symbols 5, 6, 12, and 13, transmission may be performed with the 30 kHz subcarrier spacing to adjust subcarrier spacings. Alternatively, transmission may be performed with the 15 kHz subcarrier spacing, wherein the SS block and a few frequency tones may be dropped so as to reduce ICI interference.

Figure 14:
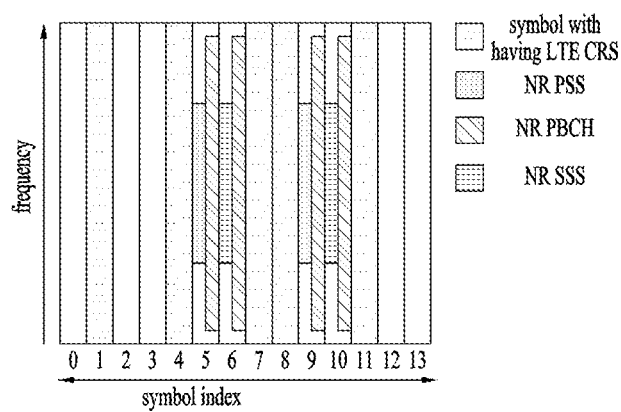

However, in the case of transmission as illustrated in FIG. 13, UCI may not be transmitted in symbol 12 or 13. To solve this problem, the (RMSI) CORESET may be transmitted in symbol 2 or 3 and the UCI may be transmitted in symbol 12 or 13, as illustrated in FIG. 14. To protect the LTE PDCCH and CRS, the SS block may be designed.

In the design as illustrated in FIG. 14, the (RMSI) CORESET may be mapped to the SS block without FDM in symbol 2 or 3 (or including symbol 9 or 10). In a symbol 12 or 13, the UCI may be transmitted. The NR (RMSI) PDCCH may be transmitted in the remaining regions. When the NR (RMSI) PDCCH is transmitted together in symbols in which the SS block is transmitted, such as symbols 5, 6, 9 and 10, transmission may be performed with the 30 kHz subcarrier spacing to adjust subcarrier spacings. Alternatively, transmission may be performed with the 15 kHz subcarrier spacing, wherein the SS block and a few frequency tones may be dropped so as to reduce ICI.

In the SS block transmitted in FIGS. 12, 13, and 14, mapping positions of the NR PBCH, which is adjacent to an NR primary synchronization signal (PSS), and the NR PSS may be interchanged. This causes a signal contacting a symbol in which the adjacent LTE PDCCH or CRS is present to be the NR PBCH, so that the PBCH which is less important than the PSS is affected in the case in which the UE fails to receive a part of the front part of the SS block or the case in which there is interference. when the UE performs another operation (e.g., UL transmission) before transmitting the NR PBCH and receives the SS block. If this principle is applied to FIGS. 13 and 14, configurations as indicated in FIGS. 15 and 16, respectively, may be acquired.

Fourth Embodiment

When an NR SS block having a 30 kHz subcarrier spacing (SCS) is transmitted in an LTE band of a 15 kHz SCS, the position of the (RMSI) CORESET has a possibility of being FDMed with an NR secondary synchronization signal (SSS) or an NR PSS as described above. In this case, since the PSS and SSS of the 30 kHz SCS use middle 24 RBs based on the 15 kHz SCS in a bandwidth of 10 MB, upper 13 RBs and lower 13 RBs are left.

Figure 15:
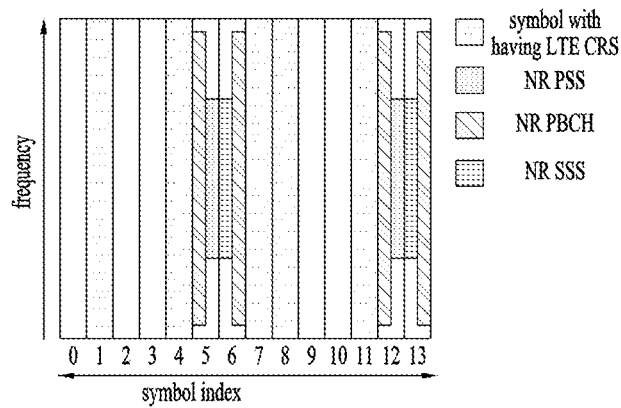
Figure 16:
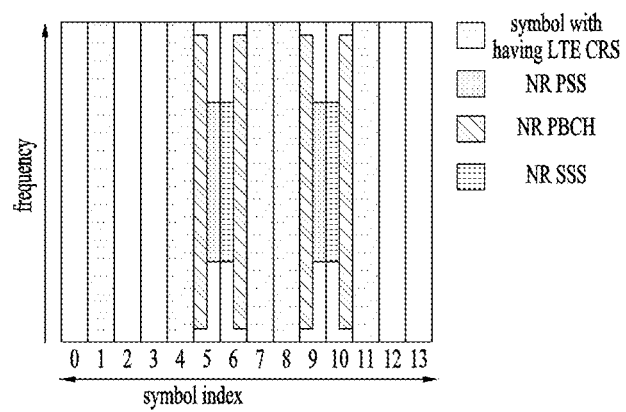

However, in order to transmit the (RMSI) CORESET of the 15 kHz SCS by being FDMed with the PSS or the SSS, the SSS and PSS should be adjacently transmitted as illustrated in FIG. 15 or 16. Since the time length of a symbol of the 30 kHz SCS is about ½ of the time length of a symbol of the 15 kHz SCS, when the PSS and the SSS are adjacently transmitted, the PSS/SSS of the 30 kHz SCS and one symbol of the 15 kHz SCS may be FDMed together. On the other hand, since the NR PBCH occupies 48 RBs based on the 15 kHz SCS, there is no possibility that the (RMSI) CORESET and the NR PBCH are FDMed together.

Therefore, in the fourth embodiment, it is proposed that the PSS and the SSS be adjacently transmitted when the SS block of the 30 kHz SCS is transmitted.

When the PSS and the SSS are adjacently transmitted, the (RMSI) CORESET may be mapped to the 13 upper remaining RBs and the 13 lower remaining RBs of the PSS/SSS. However, considering that an REG bundle size is 6, the (RMSI) CORESET should be mapped to 12 upper RBs and 12 lower RBs. In this case, the remaining one upper RB and the remaining one lower RB may be placed between the SSS/PSS and the (RMSI) CORESET. This serves to mitigate ICI which may occur due to different SCSs of the PSS/SSS and the (RMSI) CORESET. Alternatively, since there is a difference of a maximum of 11 subcarriers between a PRB grid of the SS block and a PRB grid of the RMSI on the assumption of floating synchronization, about one RB needs to be subtracted around the SS block (due to an offset).

In order for the (RMSI) CORESET of the 30 kHz SCS to be FDMed with the PSS or SSS, 26 RBs except for 24 RBs for PSS/SSS transmission are left based on the 15 kHz SCS and 13 RBs are left based on the 30 kHz SCS. However, considering that the bundle size is 6, the (RMSI) CORESET should be mapped to 6 upper RBs and 6 lower RBs. In this case, the remaining 0.5 upper RBs and the remaining 0.5 lower RBs may be placed between the SSS/PSS and the (RMSI) CORESET. This may serve to mitigate ICI which may be caused by different SCSs of the PSS/SSS and (RMSI) CORESET.

If the NR SS block having the 30 kHz SCS is transmitted in the LTE band of the 15 kHz SCS, when a symbol in which the LTE CRS is present and the position of the NR SS block are used as reserved resources, there is a possibility that the (RMSI) PDSCH is discontinuously transmitted. In this case, such a transmission pattern may be indicated through the control channel. Alternatively, it may be regulated that a symbol to which the CRS is mapped and the position of the SS block are rate-matched. Alternatively, the reserved resources may be indicated as a reserved resource concept and it may be regulated that the reserved resources are rate-matched.

Figure 17:
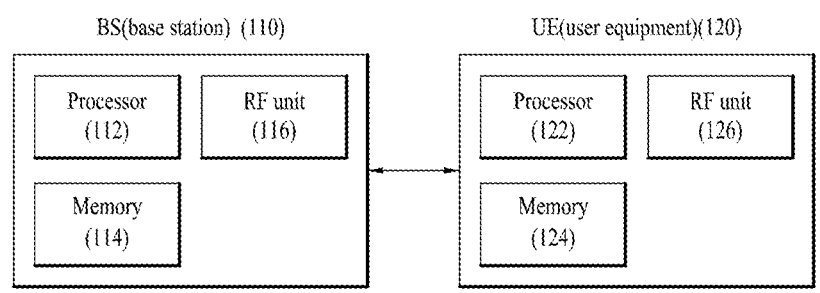
FIG. 17 illustrates a base station (BS) and a user equipment (UE) applicable to an embodiment of the present disclosure.

FIG. 17 illustrates a base station (BS) and a user equipment (UE) applicable to an embodiment of the present disclosure.

If a relay node is included in a wireless communication system, backhaul link communication is performed between the BS and the relay node, and access link communication is performed between the relay node and the UE. Therefore, the BS or UE shown in the drawing may be replaced with the relay node in some cases.

Referring to FIG. 17, a wireless communication system includes a base station (BS) 110 and a user equipment (UE) 120. The BS 110 includes a processor 112, a memory 114 and an RF (radio frequency) unit 116. The processor 112 can be configured to implement the procedures and/or methods proposed in the present disclosure. The memory 114 is connected to the processor 112 and stores various kinds of information related to operations of the processor 112. The RF unit 116 is connected to the processor 112 and transmits and/or receives radio or wireless signals. The UE 120 includes a processor 122, a memory 124 and an RF unit 126. The processor 122 can be configured to implement the procedures and/or methods proposed in the present disclosure. The memory 124 is connected to the processor 122 and stores various kinds of information related to operations of the processor 122. The RF unit 126 is connected to the processor 122 and transmits and/or receives radio or wireless signals. The BS 110 and/or the UE 120 can have a single antenna or multiple antennas.

The above-described embodiments may correspond to combinations of elements and features of the present disclosure in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present disclosure by combining elements and/or features together in part. A sequence of operations explained for each embodiment of the present disclosure may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a BS can be performed by an upper node of the BS in some cases. In particular, in a network constructed with a plurality of network nodes including a BS, it is apparent that various operations performed for communication with a UE can be performed by a BS or other network nodes except the BS. In this case, 'BS' can be replaced by such a terminology as a fixed station, a Node B, an eNodeB (eNB), an access point and the like.

The embodiments of the present disclosure may be implemented using various means. For instance, the embodiments of the present disclosure may be implemented using hardware, firmware, software and/or any combinations thereof. In case of the implementation by hardware, one embodiment of the present disclosure may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present disclosure may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present disclosure can be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

INDUSTRIAL APPLICABILITY

In the wireless communication system as described above, the method of transmitting and receiving an LTE-based signal and an NR-based signal and an apparatus therefor are applicable to various wireless communication systems.

What is claimed is:

1. A method of transmitting a signal by a new radio access technology (NR) base station (BS) in a wireless communication system, the method comprising:
confirming a configuration associated with a first subframe allocated to a long-term evolution (LTE) band;
determining a resource region to which an NR downlink signal is allocable in a second subframe shared for NR communication in the LTE band based on the confirmed configuration; and
transmitting a control resource set (CORESET) through the resource region,
wherein a starting point of the second subframe is immediately after an ending point of a Physical Control Channel (PDCCH) region of the first subframe, based on the PDCCH region being maximally configured in the first subframe,
wherein an ending point of the second subframe is an ending point of the first subframe,
wherein, based on the resource region including first resources for a demodulation reference signal (DMRS), the DMRS is transmitted via second resources after N symbols from the first resources, and
wherein N symbols is a number of symbols for the PDCCH region, based on the PDCCH region being maximally configured in the first subframe.

2. The method of claim 1, wherein the second subframe is a multicast-broadcast single-frequency network (MBSFN) subframe.

3. The method of claim 1, wherein the CORESET is allocated by being rate-matched in a resource region except for a PDCCH region for LTE communication in the second subframe.

4. The method of claim 3, further comprising transmitting information about the resource region to an NR user equipment (UE) through higher layer signaling.

5. The method of claim 3, further comprising transmitting a configuration regarding the CORESET to an NR user equipment (UE).

6. A new radio access technology (NR) base station (BS) configured to operate in a wireless communication system, the NR BS comprising:
a radio frequency unit; and
a processor coupled to the radio frequency unit,
wherein the processor is configured to
confirm a configuration associated with a first subframe allocated to a long-term evolution (LTE) band,
determine a resource region to which an NR downlink signal is allocable in a second subframe shared for NR communication in the LTE band based on the confirmed configuration, and
transmit a control resource set (CORESET) through the resource region,
wherein a starting point of the second subframe is immediately after an ending point of a Physical Control Channel (PDCCH) region of the first subframe, based on the PDCCH region being maximally configured in the first subframe,
wherein an ending point of the second subframe is an ending point of the first subframe,
wherein, based on the resource region including first resources for a demodulation reference signal (DMRS), the DMRS is transmitted via second resources after N symbols from the first resources, and
wherein N symbols is a number of symbols for the PDCCH region, based on the PDCCH region being maximally configured in the first subframe.

7. A method of receiving a signal by a new radio access technology (NR) user equipment (UE) in a wireless communication system, the method comprising:
confirming a configuration associated with a first subframe allocated to a long-term evolution (LTE) band; and
receiving a control resource set (CORESET) through a resource region to which an NR downlink signal is allocated in a second subframe shared for NR communication in the LTE band based on the confirmed configuration,
wherein a starting point of the second subframe is immediately after an ending point of a Physical Control Channel (PDCCH) region of the first subframe, based on the PDCCH region being maximally configured in the first subframe, wherein an ending point of the second subframe is an ending point of the first subframe, wherein, based on the resource region including first resources for a demodulation reference signal (DMRS), the DMRS is transmitted via second resources after N symbols from the first resources, and wherein N symbols is a number of symbols for the PDCCH region, based on the PDCCH region being maximally configured in the first subframe.

8. A new radio access technology (NR) user equipment (UE) for receiving a signal in a wireless communication system, the NR UE comprising:

a radio frequency unit; and a processor coupled to the radio frequency unit, wherein the processor is configured to confirm a configuration associated with a first subframe allocated to a long-term evolution (LTE) band, and receive a control resource set (CORESET) through a resource region to which an NR downlink signal is allocated in a second subframe shared for NR communication in the LTE band based on the confirmed configuration, wherein a starting point of the second subframe is immediately after an ending point of a Physical Control Channel (PDCCH) region of the first subframe, based on the PDCCH region being maximally configured in the first subframe, wherein an ending point of the second subframe is an ending point of the first subframe, wherein, based on the resource region including first resources for a demodulation reference signal (DMRS), the DMRS is transmitted via second resources after N symbols from the first resources, and wherein N symbols is a number of symbols for the PDCCH region, based on the PDCCH region being maximally configured in the first subframe.

* * * * *